US008543101B2

(12) United States Patent
Kunugi et al.

(10) Patent No.: US 8,543,101 B2
(45) Date of Patent: Sep. 24, 2013

(54) WIRELESS COMMUNICATION SYSTEM, WIRELESS BASE STATION, MOBILE STATION, AND WIRELESS COMMUNICATION METHOD

(75) Inventors: Takeshi Kunugi, Yokohama (JP); Reiko Hattori, Yokohama (JP); Noboru Hasegawa, Oota (JP); Teruyoshi Watanabe, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/558,622

(22) Filed: Jul. 26, 2012

(65) Prior Publication Data

US 2013/0079041 A1    Mar. 28, 2013

(30) Foreign Application Priority Data

Sep. 22, 2011 (JP) ................................. 2011-206694

(51) Int. Cl.
*H04M 3/00* (2006.01)
(52) U.S. Cl.
USPC ..................... 455/418; 455/550.1; 455/562.1; 370/252
(58) Field of Classification Search
USPC ................... 455/418, 550.1, 562.1; 370/252
See application file for complete search history.

(56) References Cited

U.S. PATENT DOCUMENTS

| 6,438,375 | B1 | 8/2002 | Muller |
| 6,990,320 | B2 * | 1/2006 | LeCren ....................... 455/67.11 |
| 8,259,675 | B2 * | 9/2012 | Tamura et al. ................. 370/331 |
| 2002/0065082 | A1 * | 5/2002 | Yegani et al. .................. 455/452 |
| 2002/0102986 | A1 * | 8/2002 | Iwamura et al. .............. 455/453 |
| 2003/0107991 | A1 * | 6/2003 | Tezuka et al. ................. 370/229 |
| 2003/0162503 | A1 * | 8/2003 | LeCren ......................... 455/67.1 |
| 2007/0225012 | A1 * | 9/2007 | Chang et al. ................. 455/452.2 |
| 2008/0069006 | A1 * | 3/2008 | Walter et al. ................. 370/252 |
| 2013/0028187 | A1 * | 1/2013 | Aoyagi et al. ................. 370/328 |

FOREIGN PATENT DOCUMENTS

JP     2002-538744     11/2002

* cited by examiner

*Primary Examiner* — Danh Le
(74) *Attorney, Agent, or Firm* — Katten Muchin Rosenman LLP

(57) ABSTRACT

A mobile station that includes a mobile station controller which performs a process of responding to a call signal and a wireless base station that includes a base station controller which performs a determination of a priority of the call signal to be transmitted to the mobile station and a baseband unit that transmits a first call signal having a first priority to the mobile station and that stores a second call signal having a second priority in a queue and performs a transmission process wherein when the second call signal has been discarded, the baseband unit notifies the mobile station of information representing that the second call signal has been discarded and the mobile station controller executes, when deciding the second call signal has been discarded, a processing of an inquiry response to the wireless base station.

6 Claims, 12 Drawing Sheets

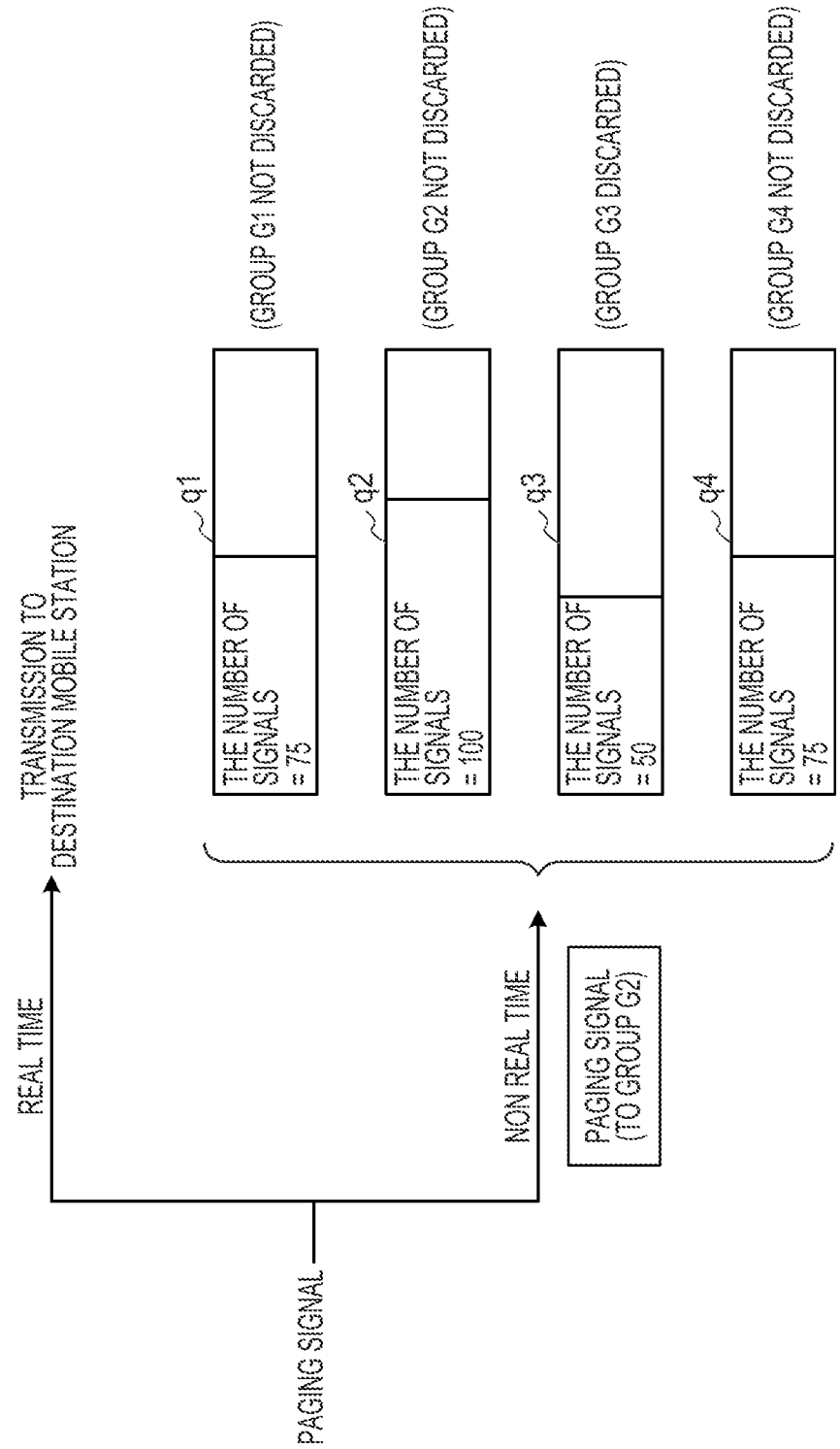

FIG. 6B

| THE NUMBER OF SIGNALS = 75 | q1 | (GROUP G1 NOT DISCARDED) |

| THE NUMBER OF SIGNALS = 101 | q2 | (GROUP G2 NOT DISCARDED) |

| THE NUMBER OF SIGNALS = 49 | q3 | (GROUP G3 DISCARDED) |

| THE NUMBER OF SIGNALS = 75 | q4 | (GROUP G4 NOT DISCARDED) |

FIG. 10

| | | 11e |
|---|---|---|
| GROUP G1 | PRESENCE OR ABSENCE OF PAGING DISCARDING | 1 |
| | DISCARDED USER ID | 00000000 |
| | | 11111111 |
| | | 22222222 |
| | | ⋮ |
| GROUP G2 | PRESENCE OR ABSENCE OF PAGING DISCARDING | 0 |
| | DISCARDED USER ID | |
| | | |
| | | |
| | | ⋮ |
| GROUP G3 | PRESENCE OR ABSENCE OF PAGING DISCARDING | 0 |
| | DISCARDED USER ID | |
| | | |
| | | |
| | | ⋮ |

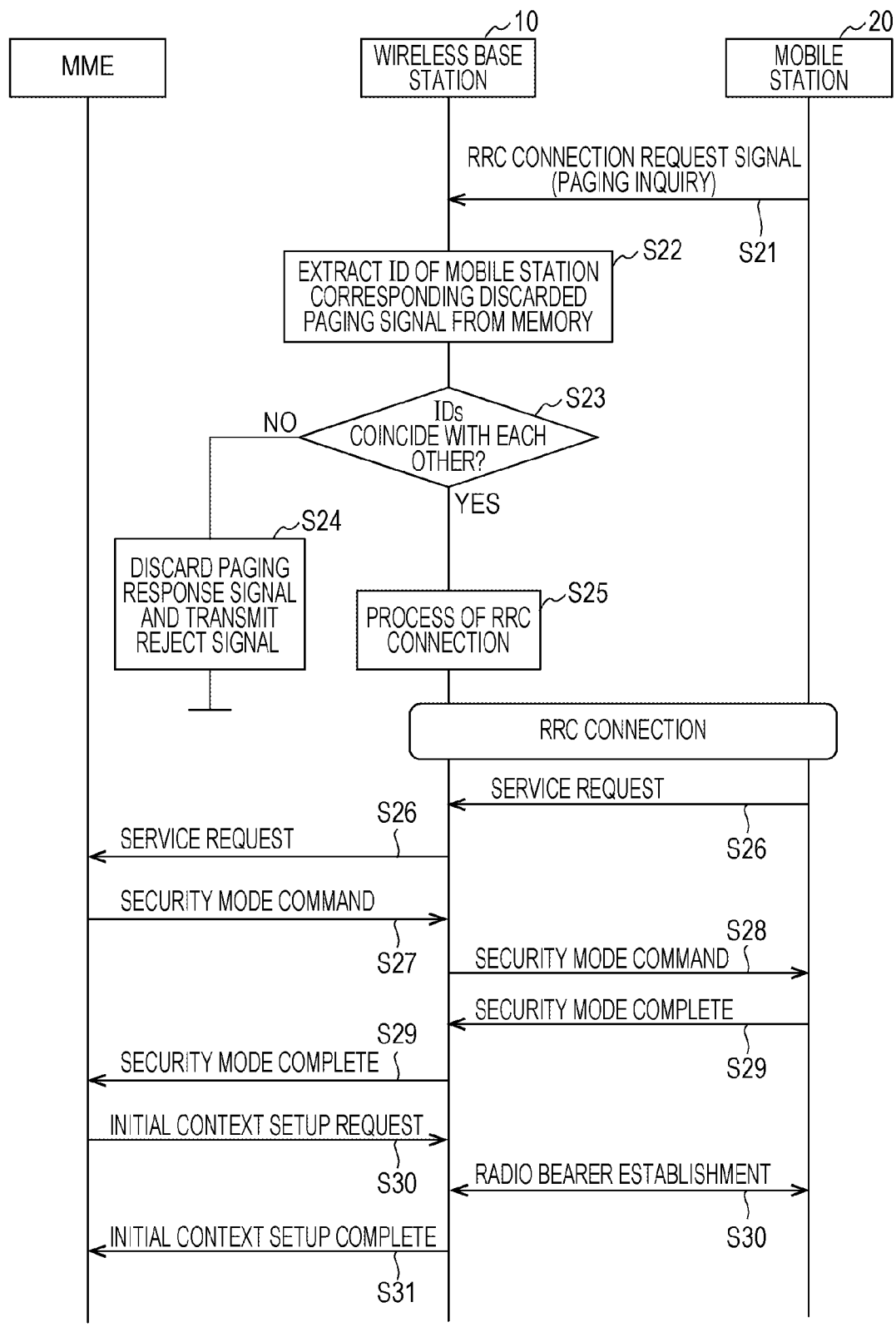

WIRELESS COMMUNICATION SYSTEM, WIRELESS BASE STATION, MOBILE STATION, AND WIRELESS COMMUNICATION METHOD

CROSS-REFERENCE TO RELATED APPLICATION

This application is based upon and claims the benefit of priority of the prior Japanese Patent Application No. 2011-206694, filed on Sep. 22 2011, the entire contents of which are incorporated herein by reference.

FIELD

The embodiments discussed herein is related to a wireless communication system, a wireless base station, a mobile station, and a wireless communication method for wireless communication.

BACKGROUND

Notification of incoming calls of telephones and notification of information representing that e-mails have been stored in servers to someone is referred to as "paging", and a call signal thereof is referred to as a "paging signal".

In a paging process, a wireless base station notifies a mobile station which is in a standby mode of an incoming call by a paging signal, for example. The mobile station which receives the paging signal establishes a communication path by accessing the wireless base station. Furthermore, the number of paging signals has an upper limit set in accordance with paging channel capacity and processing capacity of equipment of the wireless base station.

In the related art, a technique of integrating a paging message and other messages and transmitting the integrated messages to a mobile terminal has been proposed.

The related art is disclosed in Japanese Laid-open Patent Publication No. 2002-538744 is for example.

However, in the paging process in the related art, when the number of paging signals exceeds an upper limit, a number of paging signals which exceeds the upper limit are simply discarded by a wireless base station irrespective of priority degrees(service types) of the paging signals.

Therefore, some mobile stations do not receive the paging signals, and such mobile stations do not recognize incoming calls and the like, and therefore, do not receive data. Accordingly, there arises a problem in that quality of services is degraded.

SUMMARY

According to an aspect of the embodiments an apparatus includes a mobile station that includes a mobile station controller which performs a process of responding to a call signal and a wireless base station that includes a base station controller which performs a determination of a priority of the call signal to be transmitted to the mobile station and a baseband unit that transmits a first call signal having a first priority to the mobile station and that stores a second call signal having a second priority in a queue and performs a transmission process wherein when the second call signal has been discarded, the baseband unit notifies the mobile station of information representing that the second call signal has been discarded and the mobile station controller executes, when deciding the second call signal has been discarded, a processing of an inquiry response to the wireless base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6A is a diagram illustrating a process of discarding a paging signal;

FIG. 6B is a diagram illustrating the process of discarding a paging signal.

FIG. 10 is a diagram illustrating storage content.

FIG. 11 is a sequence diagram illustrating an operation of a paging response.

DESCRIPTION OF EMBODIMENTS

Figure 1:
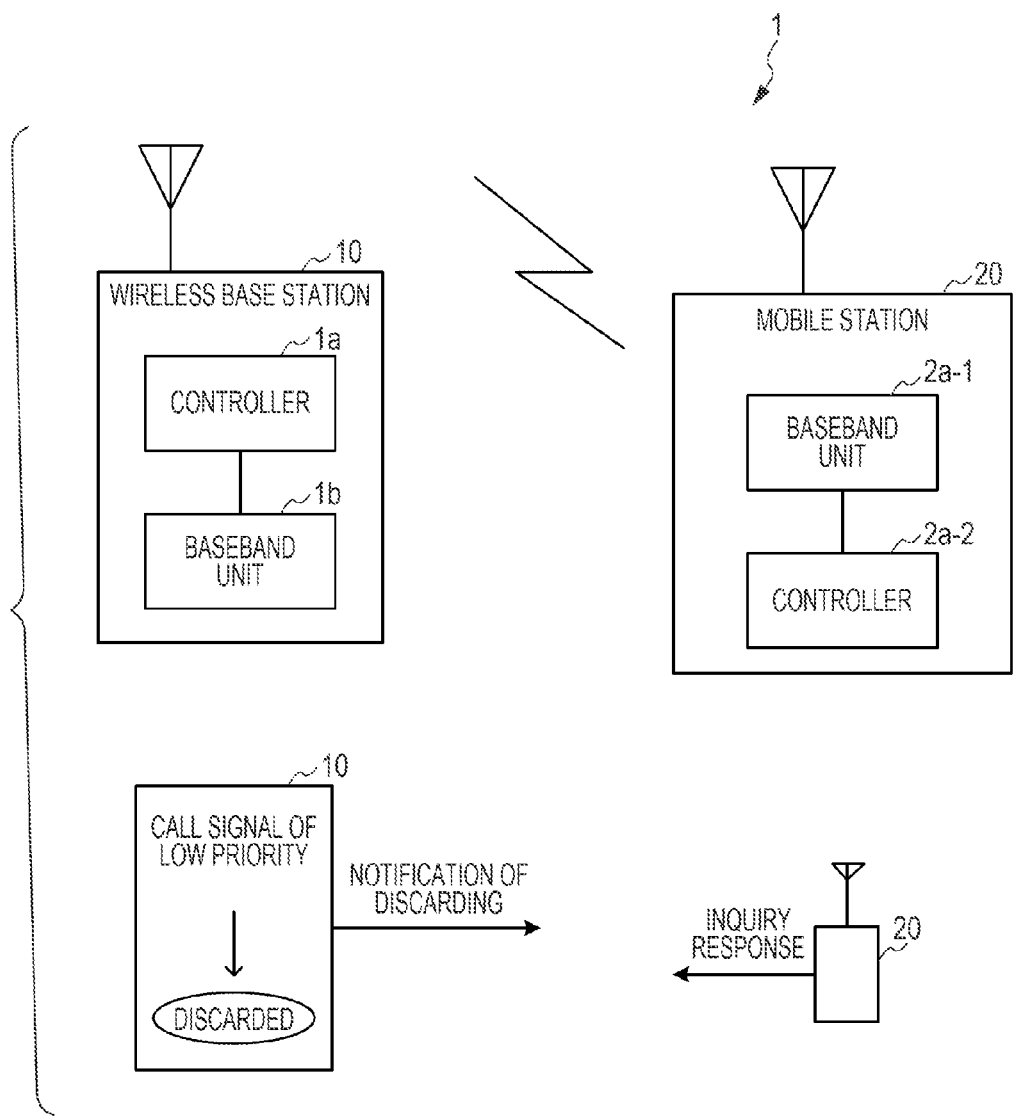
FIG. 1 is a diagram illustrating a configuration of a wireless communication system.

Hereinafter, embodiments of the present disclosure will be described with reference to the accompanying drawings. FIG. 1 is a diagram illustrating a configuration of a wireless communication system. A wireless communication system 1 includes a wireless base station 10 and a mobile station 20. The wireless base station 10 includes a controller (base station controller) is and a baseband unit 1b. The mobile station 20 includes a baseband unit 2a-1 and a controller (mobile station controller) 2a-2.

The controller is determines a priority degree of a call signal to be transmitted to the mobile station 20. The baseband unit lb transmits a first call signal having a first priority degree to the mobile station 20. Furthermore, the baseband unit lb stores a second call signal having a second priority degree which is lower than the first priority degree in a queue and performs a transmission process.

Moreover, when the second call signal is discarded since storage capacity of the queue is exceeded, for example, the baseband unit lb notifies the mobile station 20 of information representing that the second call signal has been discarded.

When a call signal to be transmitted to the mobile station 20 is discarded in the wireless base station 10, the baseband unit 2a-1 included in the mobile station 20 receives a notification representing that the call signal has been discarded.

When recognizing that the call signal has been discarded, the controller 2a-2 automatically performs an inquiry response to the wireless base station 10.

As described above, in the wireless communication system 1, the wireless base station 10 determines priority degrees of call signals and transmits call signals having high priority degrees to the mobile station 20. On the other hand, the wireless base station 10 stores call signals having low priority degrees in queues and performs a transmission process.

After discarding a call signal having a low priority degree, the wireless base station 10 notifies the mobile station 20 of information representing that the call signal having the low priority degree has been discarded. Thereafter, when recognizing the information representing that the call signal has been discarded, the mobile station 20 performs an inquiry response to the wireless base station 10 in this configuration.

With this configuration, since call signals having high priority degrees are reliably transmitted to the mobile station 20, the call signals having high priority degrees, i.e., real-time call signals such as telephone incoming calls are not discarded. Furthermore, when a call signal having a low priority degree is discarded, an inquiry response is performed. Therefore, the mobile station 20 (user) which recognizes that the paging signal has been discarded may be connected to the wireless base station 10 and suppress miss of reception of data and the like.

As described above, since paging signals are efficiently transmitted in accordance with priority degrees and an inquiry response is performed when a paging signal is discarded, miss of reception of incoming calls is suppressed and miss of reception of e-mails is suppressed when compared with the paging process in the related art. Accordingly, service quality is considerably improved.

Here, as a countermeasure for suppressing discarding of paging signals, it is considered that a position registration area is reduced and the number of transmissions of paging signals is reduced. However, in this case, the number of position registration requests is increased, and accordingly, an increased number of position registration requests considerably occupy processing capacity of the entire system. However, in the wireless communication system 1, the processing capacity of the system is not occupied.

Meanwhile, in recent years, notification using paging is widely used in transmission of messages by e-mails of cellular phones, a mass e-mail of member's information such as mail magazines, and distribution of news using network service.

Under this situation, when the wireless communication system 1 is used, paging signals are efficiently transmitted in accordance with priority degrees and an inquiry response is performed when a paging signal is discarded. Accordingly, even when the number of paging signals is increased, the wireless communication system 1 may promptly cope with the paging signals and deterioration of paging service is suppressed.

Next, a case where the wireless communication system 1 is applied to an LTE (Long Term Evolution) which is one of high-speed data communication standards of cellular phones will be described in detail hereinafter. Furthermore, a call signal is referred to as a "paging signal" hereinafter.

Figure 2:
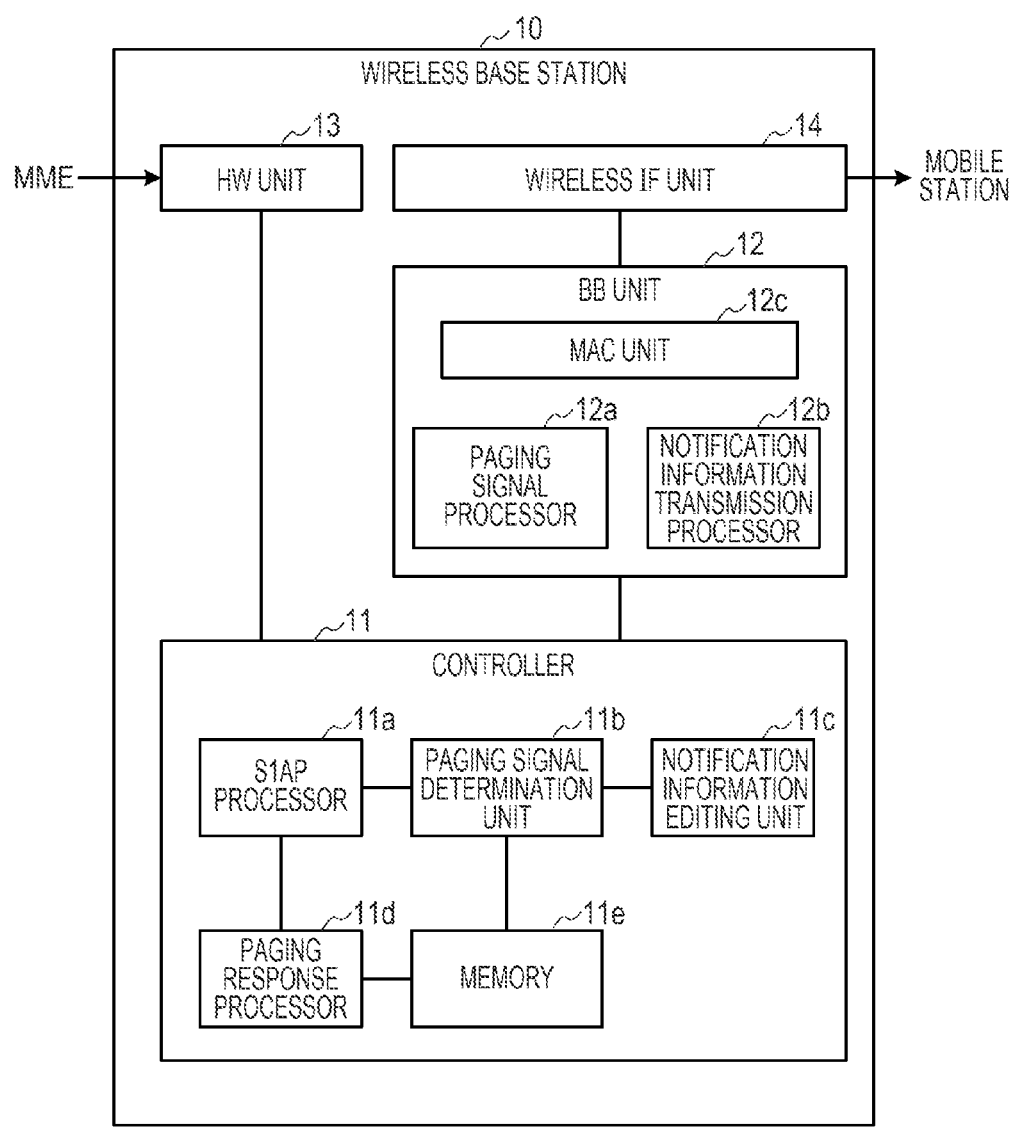
FIG. 2 is a diagram illustrating a configuration of a wireless base station.

FIG. 2 is a diagram illustrating a configuration of a wireless base station. The wireless base station 10 includes a controller 11, a BB (Base Band) unit 12, an HW (High Way) unit 13, and a wireless IF (interface) unit 14.

The controller 11 includes an S1AP (S1 Application Protocol) processor 11$a$, a paging signal determination unit 11$b$, a notification information editing unit 11$c$, a paging response processor 11$d$, and a memory 11$e$. The BB unit 12 includes a paging signal processor 12$a$, a notification information transmission processor 12$b$, and a MAC (Media Access Control) unit 12$c$.

Note that the controller 11 has a function of the controller is illustrated in FIG. 1 and the BB unit 12 has a function of the baseband unit 1$b$ illustrated in FIG. 1.

The HW unit 13 terminates an IP (Internet Protocol) network and performs an interface process for communication with an MME (Mobility Management Entity: a logical node which accommodates the wireless base station, which provides a mobility control function, and which positions on a network side). The MME serves as a host node. The wireless IF unit 14 performs an interface process for wireless communication with the mobile station 20.

In the controller 11, the S1AP processor 11$a$ analyzes an S1AP message transmitted from the MME and determines whether the message is a paging signal. Note that the S1AP is a name of a control protocol used for communication between a network (core network) and the wireless base station 10 in the LTE.

The paging signal determination unit 11$b$ determines a priority degree of the paging signal and a group of the paging signal. After the determinations, the paging signal determination unit 11$b$ transmits the paging signal and results of the determinations to the paging signal processor 12$a$.

The notification information editing unit 11$c$ edits notification information (transmitted by a BCCH (Broadcasting Control Channel)). Specifically, the notification information editing unit 11$c$ sets flag information which will be described hereinafter to the notification information. Note that the notification information used in the LTE includes a location number used for a determination as to whether a position of a mobile station is to be registered and neighboring cell information or information used to control outgoing call restriction and is simultaneously broadcasted in a unit of neighboring cell.

The paging response processor 11$d$ receives a paging response signal transmitted from the mobile station 20 and performs a process associated with an inquiry response of a paging signal. The memory 11$e$ stores information such as an identifier of a mobile station serving as a transmission destination of a discarded paging signal.

In the BB unit 12, the paging signal processor 12$a$ performs a process of transmitting paging signals having high priority degrees which have been supplied from the controller 11. Furthermore, the paging signal processor 12$a$ has transmission queues therein which store paging signals having low priority degrees which have been supplied from the controller 11 in a unit of group and discards paging signals or perform a transmission process.

The notification information transmission processor 12$b$ performs a transmission process for transmitting the notification information which has been edited to the mobile station 20. The MAC unit 12$c$ performs an interface process in the MAC layer.

Note that the controller 11 performs general communication control in addition to operations of the S1AP processor 11$a$, the paging signal determination unit 11$b$, the notification information editing unit 11$c$, the paging response processor 11$d$, and the memory 11$e$.

Figure 3:
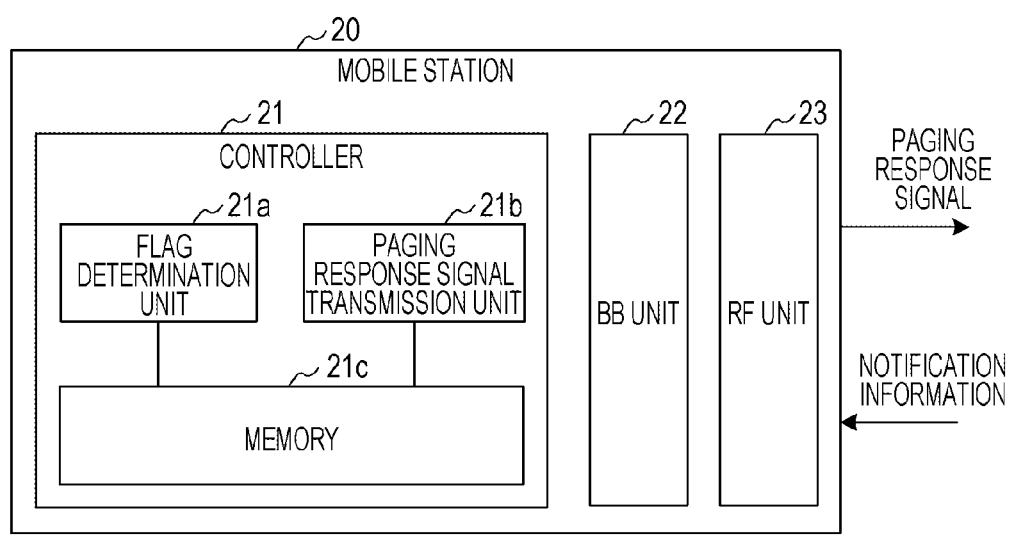
FIG. 3 is a diagram illustrating a configuration of a mobile station.

FIG. 3 is a diagram illustrating a configuration of a mobile station. The mobile station 20 includes a controller 21, a BB unit 22, and an RF (Radio Frequency) unit 23. The controller 21 includes a flag determination unit 21$a$, a paging response signal transmission unit 21$b$, and a memory 21$c$. Note that the controller 21 has a function of the controller 2$a$-2 illustrated in FIG. 1 and the BB unit 22 has a function of the baseband unit 2$a$-1 illustrated in FIG. 1.

The flag determination unit 21$a$ recognizes flag information included in notification information supplied from the wireless base station 10 and determines whether a paging signal which corresponds to a group of the mobile station 20 has been discarded in the wireless base station 10.

When recognizing that the paging signal which corresponds to the group of the mobile station 20 has been discarded, the paging response signal transmission unit 21b transmits a paging response signal to the wireless base station 10 as an inquiry response. The memory 21c stores an identifier and the like of the mobile station 20.

Note that the controller 21 performs general communication control in addition to operations of the flag determination unit 21a, the paging response signal transmission unit 21b, and the memory 21c.

The BB unit 22 performs a modulation process, a demodulation process, and the like on a digital baseband signal. The RF unit 23 performs a wireless interface process such as up-convert in which a baseband is converted into a wireless frequency band and down-convert in which a wireless frequency band is converted into a baseband.

Figure 4:
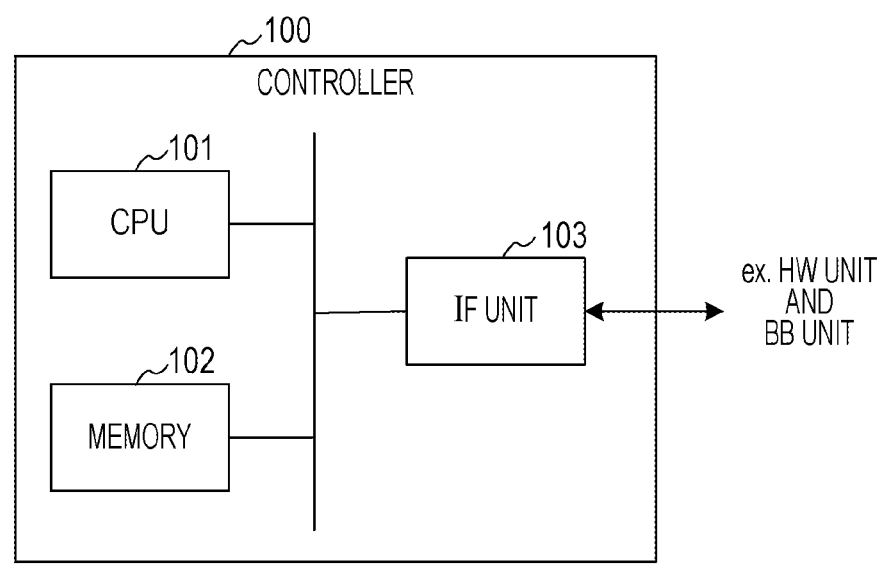
FIG. 4 is a diagram illustrating a hardware configuration of a controller.

Next, hardware configurations of the wireless base station 10 and the mobile station 20 will be described. FIG. 4 is a diagram illustrating a hardware configuration of a controller. A hardware configuration of a controller 100 corresponds to that of the controller 11 of the wireless base station 10 and that of the controller 21 of the mobile station 20. The controller 100 includes a CPU (Central Processing Unit) 101, a memory 102, and an IF unit 103 which are connected to one another through a bus.

When the controller 100 is applied to the controller 11 of the wireless base station 10, the CPU 101 realizes the operation functions of the S1AP processor 11a, the paging signal determination unit 11b, the notification information editing unit 11c, and the paging response processor 11d. The memory 102 corresponds to the memory 11e. The IF unit 103 performs a process of interfacing with the HW unit 13 and the BB unit 12.

When the controller 100 is applied to the controller 21 of the mobile station 20, the CPU 101 realizes the operation functions of the flag determination unit 21a and the paging response signal transmission unit 21b. The memory 102 corresponds to the memory 21c.

Figure 5:
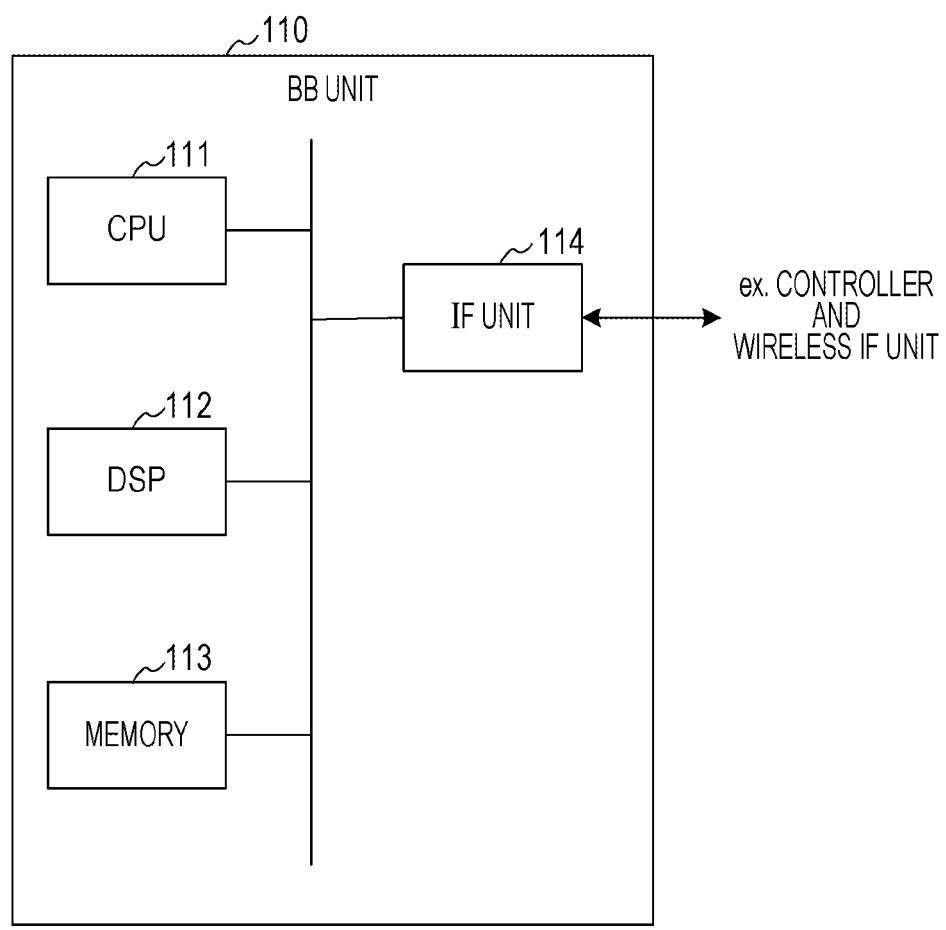
FIG. 5 is a diagram illustrating a hardware configuration of a BB unit.

FIG. 5 is a diagram illustrating a hardware configuration of a BB unit. A hardware configuration of a BB unit 110 corresponds to that of the BB unit 12 of the wireless base station 10 and that of the BB unit 22 of the mobile station 20. The BB unit 110 includes a CPU 111, a DSP (Digital Signal Processor) 112, a memory 113, and an IF unit 114 which are connected to one another through a bus.

When the BB unit 110 is applied to the BB unit 12 of the wireless base station 10, the DSP 112 realizes the operation functions of the paging signal processor 12a, the notification information transmission processor 12b, and the MAC unit 12c. The IF unit 114 performs a process of interfacing with the controller 11 and the wireless IF unit 14.

Next, a process of discarding a paging signal will be described. FIGS. 6A and 6B are diagrams illustrating the process of discarding a paging signal. In FIG. 6A, when the wireless base station 10 receives a paging signal supplied from the MME, the paging signal determination unit 11b determines whether the paging signal is a real-time paging signal or a non-real-time paging signal so as to determine a priority degree of the received paging signal.

Note that the real-time paging signal corresponds to a paging signal having a first priority degree and the non-real-time paging signal corresponds to a paging signal having a second priority degree. Furthermore, examples of the real-time paging signal include a telephone incoming call whereas examples of the non-real-time paging signal include an e-mail notification and distributed news.

The paging signal processor 12a performs a process of transmitting the real-time paging signal to the mobile station 20. On the other hand, the paging signal processor 12a stores the non-real-time paging signal in a transmission queue provided for each group (queuing).

Here, grouping of mobile stations 20 will be described. The paging signal processor 12a assigns identifiers to the mobile stations 20 which are under control of the wireless base station 10 and performs grouping in accordance with the identifiers. For example, the grouping may be performed using a TMSI (Temporary Mobile Subscriber Identity). The TMSI is a temporal ID used for user authentication in a core network.

When the grouping is performed using the TMSI, a value of the TMSI modulo 256 is calculated so that a value of a remainder (256 different values) is obtained by dividing the value of the TMSI by 256. Accordingly, 256 groups are obtained.

Meanwhile, after the grouping of the mobile stations 20 is performed and the number of groups is determined, transmission queues (logical queues) for the individual groups are provided. In the case of FIG. 6A, four groups including groups G1 to G4 are obtained and transmission queues q1 to q4 are provided for the groups G1 to G4, respectively.

Next, a process of discarding a paging signal performed when a non-real-time paging signal corresponds to the group G2 will be described.

Note that it is assumed that entire storage capacity of the transmission queues q1 to q4 is 300. Furthermore, it is assumed that the number of paging signals currently stored in the transmission queue q1 is 75 and the number of paging signals currently stored in the transmission queue q2 is 100. Moreover, it is assumed that the number of paging signals currently stored in the transmission queue q3 is 50 and the number of paging signals currently stored in the transmission queue q4 is 75, that is, 300 paging signals are currently stored.

If a group in which a paging signal has been previously discarded within a given period of time exists, the paging signal processor 12a performs a process of discarding paging signals which are to be transmitted to the mobile station 20 and which belong to the group by giving priority to the paging signals. If the group in which a paging signal has been previously discarded does not exist, a paging signal stored last of all in one of the transmission queues of the groups is discarded.

In this example, it is assumed that a paging signal has been previously discarded from the transmission queue q3 and the 300 paging signals have been stored in the transmission queues q1 to q4.

It is assumed that a paging signal corresponding to the group G2 is newly received in this state (a group of the paging signal may be recognized from an identifier of a destination mobile station). When this paging signal is stored in the transmission queue q2, the entire capacity of the transmission queues q1 to q4 is exceeded and overflow occurs. Therefore, a paging signal is discarded from the transmission queue q3 from which a paging signal has been previously discarded.

FIG. 6B is a diagram illustrating storage states of the transmission queue q1 to q4 obtained after a paging signal is discarded. Since a paging signal is discarded from the transmission queue q3 of the group G3, the number of paging signals stored in the transmission queue q3 is changed from 50 to 49. Furthermore, since the received paging signal corresponding to the group G2 is stored in the transmission queue q2 of the group G2, the number of paging signals stored in the transmission queue q2 is changed from 100 to 101.

As described above, after dividing the mobile stations 20 into groups, storing a non-real-time call signal in a transmission queue corresponding to a certain group, and discarding the call signal, the wireless base station 10 transmits information representing the group from which the call signal is discarded to the mobile station 20. Then the mobile station 20 executes an inquiry response to the wireless base station 10 when recognizing that the call signal of the group to which the mobile station 20 belongs has been discarded. By this, an inquiry response may be efficiently performed in a unit of group.

Furthermore, as described above, when a non-real-time paging signal is to be discarded, if a group from which a paging signal has been previously discarded exists, the non-real-time paging signal is discarded from the group. By this, only one transmission queue of a discarding group is used and processing is facilitated.

Note that, although the transmission queues are provided for individual groups in the foregoing description, the transmission queues may be provided for individual Paging Causes (priority degrees of paging signals (service types)). In this case, a transmission prediction time point of a paging signal is calculated. When the transmission prediction time point exceeds a prescribed value, a signal corresponding to a transmission prediction time point which exceeds the prescribed value may be discarded from a transmission queue corresponding to a Paging Cause of a low priority degree.

Next, a process of notification to the mobile station 20 will be described. When discarding a non-real-time paging signal as described above, the wireless base station 10 notifies the mobile station 20 of information on the discarding. In this case, flag information used to recognize a group from which the paging signal has been discarded is set in notification information which is to be transmitted to all mobile stations which have been under control of the wireless base station 10.

Figure 7:
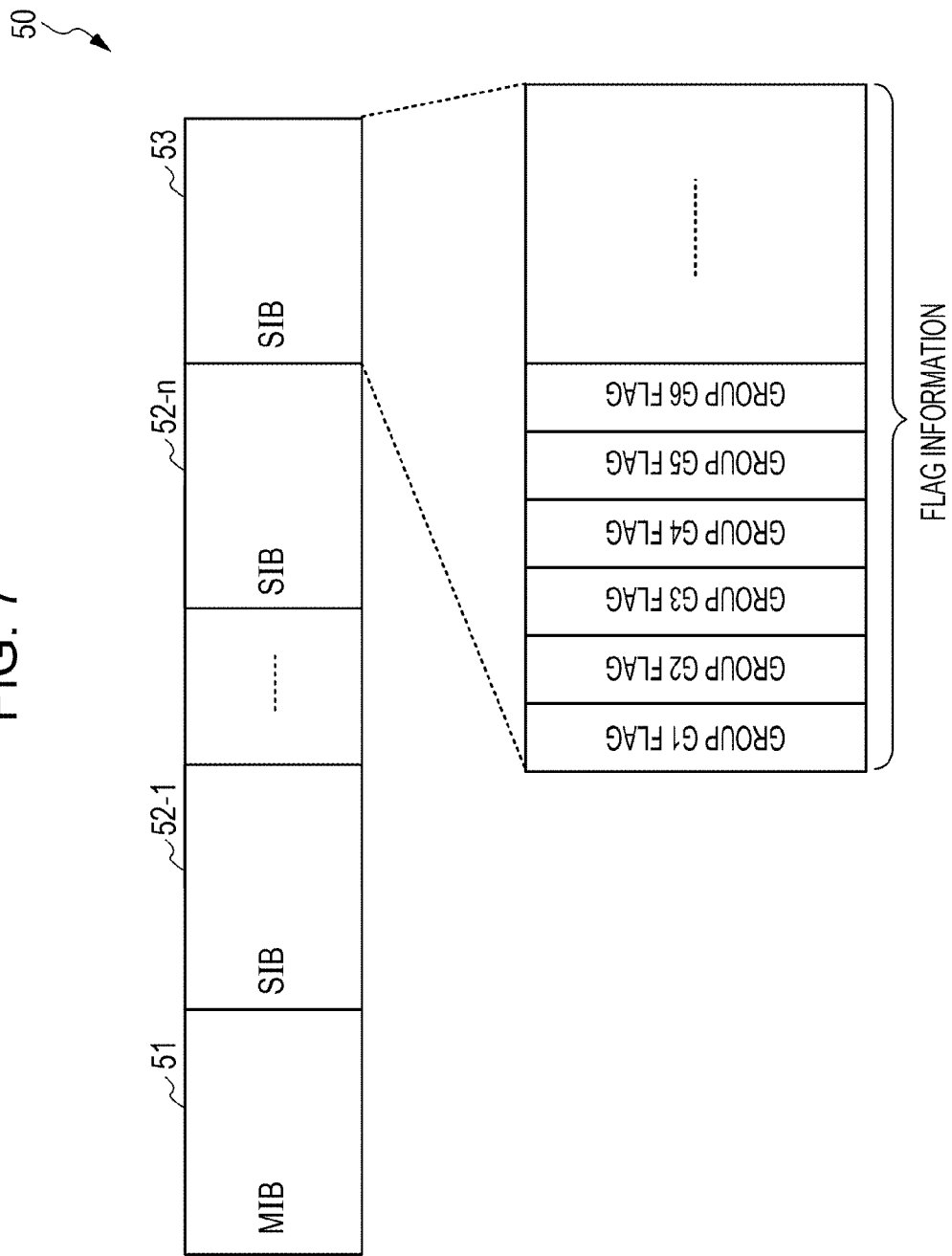
FIG. 7 is a diagram illustrating a configuration of a format of notification information.

FIG. 7 is a diagram illustrating a configuration of a format of notification information. Notification information 50 includes an MIB (Master Information Block) 51, SIBs (System Information Blocks) 52-1 to 52-*n*, and an SIB 53. As the notification information used in the LTE, certain information is periodically transmitted from the wireless base station 10 to the mobile station 20. Note that the SIB 53 is additionally provided.

In the LTE, system information is divided into an MIB which is a fixed-length resource and an SIB which is a variable-length resource before transmission. In the MIB 51, information on a cell band width of a downlink, information on the number of system frames, and the like are set, for example. Furthermore, in the SIBs 52-1 to 52-*n*, information on a configuration of a control channel, regulatory information, and the like are set.

Furthermore, in the SIB 53 additionally provided, flag information of individual groups is set. As a setting of the flag information, for example, when the wireless base station 10 discards a paging signal of the group G3, "1" is set to a flag of the group G3, for example (whereas "0" is set when the discarding is not performed).

Figure 8:
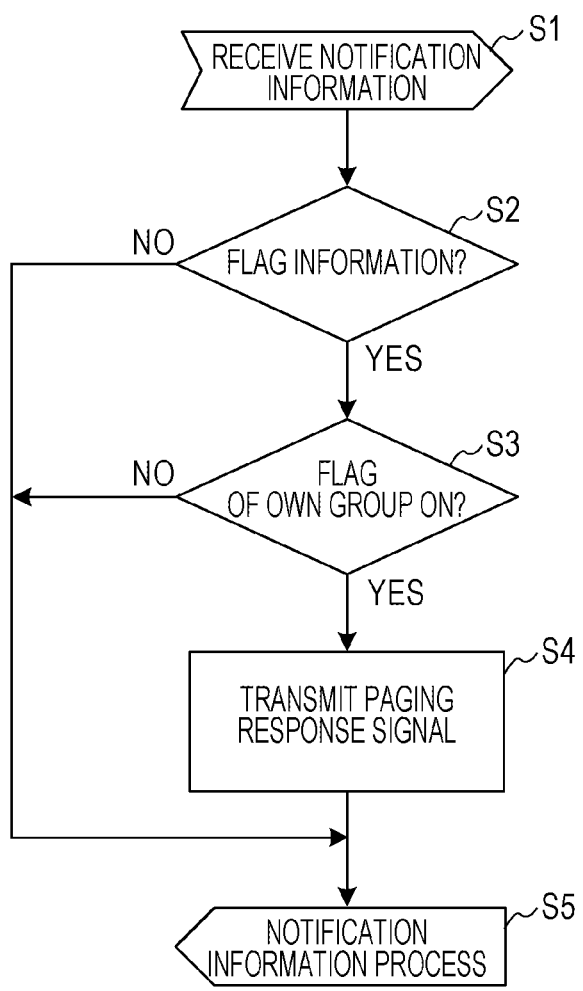
FIG. 8 is a flowchart illustrating an operation of a mobile station which receives the notification information.

Next, an operation of the mobile station 20 which receives the notification information will be described. FIG. 8 is a flowchart illustrating an operation of a mobile station which receives the notification information.

(S1) The mobile station 20 receives the notification information.

(S2) The flag determination unit 21*a* determines whether flag information is included in the received notification information. When the determination is negative, the process proceeds to operation S5 whereas when the determination is affirmative, the process proceeds to operation S3.

(S3) The flag determination unit 21*a* determines whether a flag of a group to which the mobile station 20 belongs is on in the flag information. When the determination is affirmative, the process proceeds to operation S4 whereas when the determination is negative (that is, when the flag is off), the process proceeds to operation S5.

(S4) The paging response signal transmission unit 21*b* transmits a paging response signal to the wireless base station 10 so as to perform an inquiry of a paging signal.

(S5) The controller 21 performs a given process in accordance with the notification information.

Note that, in the foregoing description, a group number from which a paging signal has been discarded is transmitted using the notification information from the wireless base station 10 to the mobile station 20. Alternatively, instead of the notification information, an identifier of the mobile station 20 such as the TMSI may be used as a group number to be transmitted by a broadcasting paging signal.

Furthermore, the mobile station 20 describes information representing that a paging response has been issued in one of parameters of an Establish Cause (cause of communication establishment: a reason an RRC is to be established is set) in an RRC (Radio Resource Control) Connection Request signal and transmits the information to the wireless base station 10. The wireless base station 10 determines whether the reception signal is a paging response signal in accordance with this Cause (which will be described with reference to FIG. 11).

Next, a mishit of a paging inquiry will be described. As described above, when recognizing that an incoming call of a group to which the mobile station 20 belongs has been issued from the flag information included in the notification information, the mobile station 20 transmits a paging response signal to the wireless base station 10.

Since the wireless base station 10 transmits information on presence or absence of a paging signal in a unit of group, it is possible that an incoming call to the mobile station 20 which has transmitted a paging response signal does not exist. Therefore, a mishit may occur when the mobile station 20 transmits the paging response signal.

However, in such a case, the paging response processor 11*d* of the wireless base station 10 discards the paging response signal supplied from the mobile station 20, and therefore, the wireless base station 10 and the mobile station 20 are not connected to each other.

Furthermore, in order to reduce mishits of paging inquiries from the mobile station 20, the wireless base station 10 may change a number of the group to which the mobile station 20 belongs.

In a group number determination process performed by the paging signal processor 12*a* of the wireless base station 10, a group number is normally determined when a position registration is performed or when attachment is performed (that is, power is turned on), for example (determination of group numbers by assigning TMSIs).

Meanwhile, a process of changing a group number (a process of changing assignment of TMSIs) may be performed when the wireless base station 10 is connected to the mobile station 20 at a time of an incoming call. The change of the group number is performed by ranking the mobile stations 20 and grouping the mobile stations 20 in accordance with the ranking, for example.

In this way, by dividing the mobile stations 20 into groups in accordance with the number of incoming calls and increasing the number of paging signals discarded from a certain group corresponding to the large number of incoming calls, a hit rate of paging response signals may be improved and the number of mishits of paging response signals may be reduced.

Figure 9:
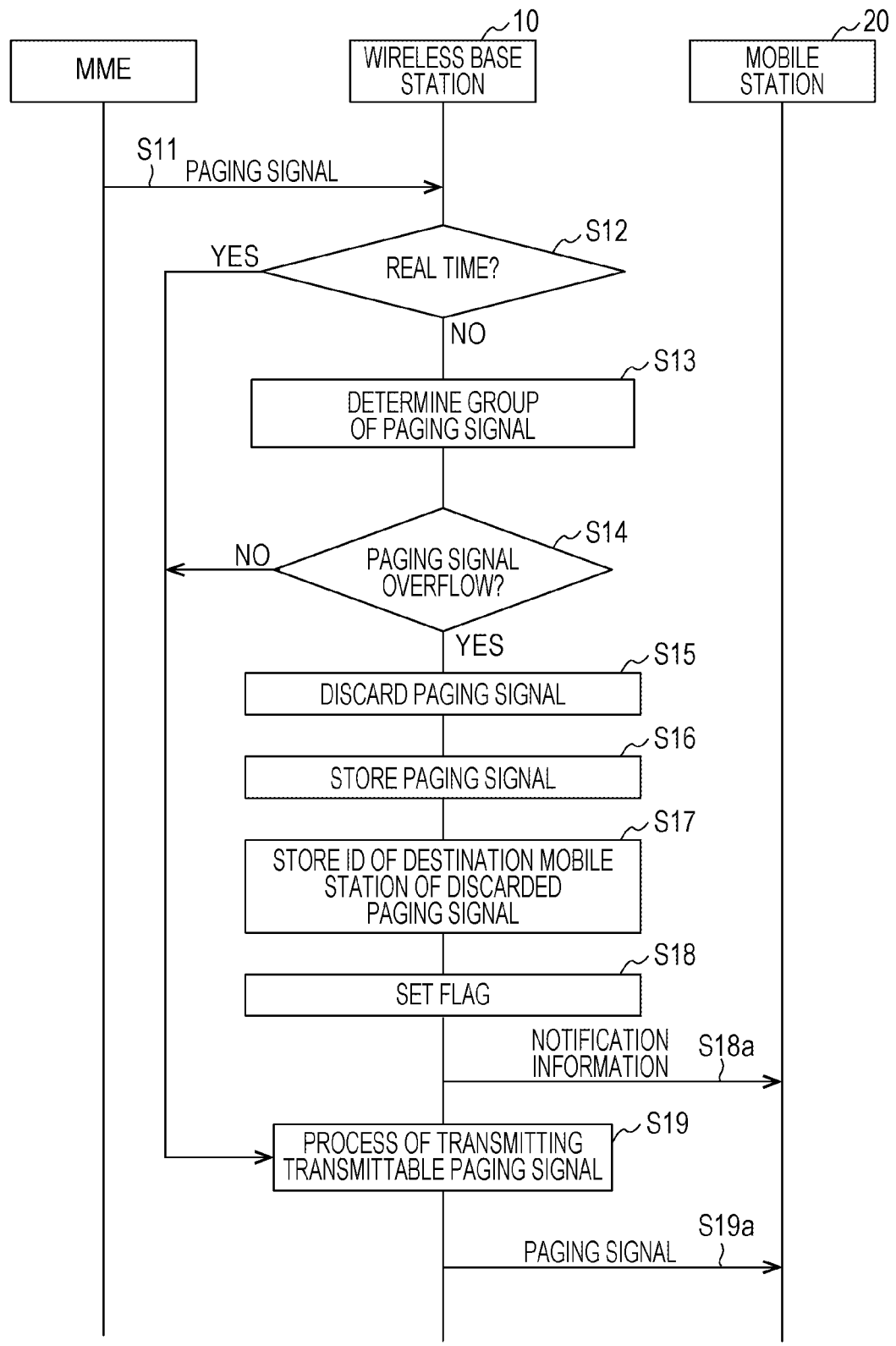
FIG. 9 is a sequence diagram illustrating the process of discarding a paging signal.

Next, a process of discarding a paging signal will be described with reference to a sequence diagram. FIG. 9 is the sequence diagram illustrating the process of discarding a paging signal.

(S11) The MME transmits a paging signal to the wireless base station 10.

(S12) The paging signal determination unit 11b determines whether the received paging signal is a real-time paging signal or a non-real-time paging signal. When the received paging signal is a real-time paging signal, the process proceeds to operation S19 whereas when the received paging signal is a non-real-time paging signal, the process proceeds to operation S13.

(S13) The paging signal determination unit 11b determines a group of the paging signal in accordance with an identifier of a destination mobile station of the paging signal (non-real-time paging signal) (determination of a group number).

(S14) The paging signal processor 12a determines whether the transmission queues are overflowed if the currently received paging signal is stored in accordance with storage states of the transmission queues. When the determination is affirmative, the process proceeds to operation S15 whereas when the determination is negative, the process proceeds to operation S19.

(S15) If a paging signal has been previously discarded from one of the transmission queue within a given period of time, the paging signal processor 12a discards a paging signal stored in the transmission queue which exceeds the capacity.

(S16) The paging signal processor 12a stores the paging signal in a transmission queue corresponding to the group of the paging signal.

(S17) The paging signal processor 12a stores an identifier of the destination mobile station of the discarded paging signal (which will be described with reference to FIG. 10).

(S18) The notification information editing unit 11c sets a flag of flag information of the group of the discarded paging signal in a given field of notification information.

(S18a) The notification information transmission processor 12b notifies the mobile station 20 of the notification information including the flag information in which the flag is set.

(S19) The paging signal processor 12a performs a process of transmitting the paging signal to the destination mobile station.

(S19a) The wireless base station 10 transmits the paging signal to the mobile station 20.

Next, storage content of discarding information of a paging signal will be described. FIG. 10 is a diagram illustrating storage content. Portions of a storage region of the memory 11e of the wireless base station 10 serve as regions representing presence or absence of discarding of a paging signal and regions representing discarding user IDs (TMSIs) which are assigned for individual groups. Note that, when a paging signal has been discarded, "1" is set in the regions representing presence or absence of discarding, and otherwise, "0" is set.

In FIG. 10, for example, in the group G1, discarding user IDs are "00000000", "11111111", and "22222222", and the presence or absence of discarding represents "1". Accordingly, paging signals to be transmitted to mobile stations having the IDs "00000000", "11111111", and "22222222" are discarded.

Next, an operation of a paging response will be described with reference to a sequence diagram. FIG. 11 is a sequence diagram illustrating an operation of a paging response.

(S21) The paging response signal transmission unit 21b of the mobile station 20 transmits a paging response signal to the wireless base station 10. Specifically, using the Establish Cause as a paging inquiry, the RRC Connection Request signal is transmitted to the wireless base station 10.

(S22) The paging response processor 11d of the wireless base station 10 extracts an identifier of the mobile station 20 from which a paging signal has been discarded in accordance with the storage content of the memory 11e illustrated in FIG. 10.

(S23) The paging response processor 11d determines whether an identifier of the mobile station 20 which transmits a paging response signal coincides with the identifier extracted in operation S22. When the determination is negative, the process proceeds to operation S24 whereas when the determination is affirmative, the process proceeds to operation S25.

(S24) The paging response processor 11d discards the received paging response signal and performs a process of sending back a reject signal (RRC Connection Reject signal).

(S25) When recognizing the paging inquiry response supplied from the mobile station 20 corresponding to the discarded paging signal, the paging response processor 11d performs a connection process of RRC Connection with the mobile station 20.

(S26) After the RRC Connection is established, the controller 21 of the mobile station 20 transmits a Service Request signal (which is an NAS (Non Access Stratum) message used for authentication between the mobile station 20 and the MME) to the MME. The Service Request signal is transmitted through the wireless base station 10 to the MME, and an L3 protocol process (for example, an EMM (Evolved Mobility Management) process) is activated.

(S27) When receiving the Service Request signal, the MME transmits a Security Mode Command signal (NAS message) through the wireless base station 10 to the mobile station 20.

(S28) The wireless base station 10 transmits the Security Mode Command signal (RRC message) to the mobile station 20.

(S29) When receiving the Security Mode Command signal, the mobile station 20 sends back a Security Mode Complete signal (RRC message). The Security Mode Complete signal is transmitted through the wireless base station 10 to the MME. In this procedure, a concealment operation is performed between the wireless base station 10 and the mobile station 20.

(S30) After the concealment operation is completed, the MME transmits an Initial Context Setup Request signal (S1AP message) to the wireless base station 10 and performs Radio Bearer connection between the wireless base station 10 and the mobile station 20.

(S31) The wireless base station 10 transmits an Initial Context Setup Complete signal to the MME. After the Radio Bearer connection is completed, the mobile station 20 and the MME are communicated with each other through the wireless base station 10.

Since the mobile station 20 is communicated with the MME through the wireless base station 10, the mobile station 20 may obtain the paging signal discarded by the wireless base station 10 from the MME.

Note that the NAS message described above is transferred by an Uplink NAS Transfer message and a Downlink NAS Transfer message on the S1AP. On the other hand, the NAS message is transferred by a UL Information Transfer message and a DL Information Transfer message on the RRC.

The embodiment of the present disclosure has been described hereinabove, and the configurations of the units described in the embodiment may be replaced by configurations having the same functions. Furthermore, other arbitrary configurations and other arbitrary processes may be added.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless communication system comprising:
a mobile station that includes a mobile station controller which performs a process of responding to a call signal; and
a wireless base station that includes a base station controller which performs a determination of a priority of the call signal to be transmitted to the mobile station and a baseband unit that transmits a first call signal having a first priority to the mobile station and that stores a second call signal having a second priority which is lower than the first priority in a queue and performs a transmission process,
wherein when the second call signal has been discarded since a limit of the queue is exceeded, the baseband unit notifies the mobile station of information representing that the second call signal has been discarded, and
the mobile station controller executes, when deciding the second call signal has been discarded, a processing of an inquiry response to the wireless base station.

2. The wireless communication system according to claim 1,
wherein the baseband unit divides a plurality of the mobile stations into groups, stores the second call signal in one of a queues of the groups, and notifies the mobile stations of information representing whether or not the discarded second call signal for individual groups when the second call signal has been discarded, and
the mobile station controller executes, when recognizing that the second call signal has been discarded from one of the groups to which the mobile station controller belongs, the inquiry response to the wireless base station.

3. The wireless communication system according to claim 2,
wherein when a group from which a call signal has been previously discarded exists, baseband unit discards the second call signal from the group when the baseband unit discards the second calling signal.

4. The wireless communication system according to claim 2,
wherein the baseband unit ranks the mobile stations in accordance with the number of incoming calls and performs grouping in accordance with the ranking.

5. A wireless base station, comprising:
a controller configured to determine a priority of a call signal to be transmitted to a mobile station; and
a baseband unit configured to transmit a first call signal having a first priority to the mobile station and to store a second call signal having a second priority which is lower than the first priority in a queue and perform a transmission process,
wherein when the second call signal has been discarded since a limit of the queue is exceeded, the baseband unit notifies the mobile station of information representing that the second call signal has been discarded.

6. A wireless communication method in a wireless base station,
comprising:
determining a priority of a call signal to be transmitted to a mobile station;
transmitting a first call signal having a first priority to the mobile station;
storing a second call signal having a second priority which is lower than the first priority in a queue and performing a transmission process; and
notifying, when the second call signal has been discarded since a limit of the queue is exceeded, the mobile station of information representing that the second call signal has been discarded, and
in the mobile station
executing, when discarding of the second call signal is recognized, an inquiry response to the wireless base station.

* * * * *